US012724536B2

(12) United States Patent
Ji

(10) Patent No.: US 12,724,536 B2
(45) Date of Patent: Sep. 1, 2026

(54) BYPASSING DIRECT MEMORY ACCESS MERGE REQUESTS TO REDUCE LATENCY ASSOCIATED WITH PERFORMING UNALIGNED WRITE OPERATIONS

(71) Applicant: Micron Technology, Inc., Boise, ID (US)

(72) Inventor: Jessie Ji, Shanghai (CN)

(73) Assignee: Micron Technology, Inc., Boise, ID (US)

(*) Notice: Subject to any disclaimer, the term of this patent is extended or adjusted under 35 U.S.C. 154(b) by 1 day.

(21) Appl. No.: 19/058,697

(22) Filed: Feb. 20, 2025

(65) Prior Publication Data

US 2026/0244345 A1 Aug. 20, 2026

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/0683* (2013.01)

(58) Field of Classification Search
None
See application file for complete search history.

(56) References Cited

U.S. PATENT DOCUMENTS 8,924,656 B1 * 12/2014 Usgaonkar ............ G06F 3/0659 711/152
2019/0114255 A1 * 4/2019 Jain ......................... G06F 3/068
2024/0069799 A1 * 2/2024 Virani ................... G06F 3/0659
2026/0056868 A1 * 2/2026 Konan .................... G06F 9/321

* cited by examiner

*Primary Examiner* — Daniel D Tsui
(74) *Attorney, Agent, or Firm* — Lowenstein Sandler LLP

(57) ABSTRACT

A frontend data segment storing a memory address that corresponds to data to be written to a block associated with a blockstripe is received from a frontend processing device. Responsive to receiving the frontend data segment, a backend data segment is generated. Data associated with a plurality of blocks, including the block, is read from a memory device. One or more memory addresses that correspond to the data that is associated with the plurality of blocks are stored in the backend data segment. The frontend data segment is updated with the one or more memory addresses that correspond to the data that is associated with the plurality of blocks. A programming operation is performed using the updated frontend data segment.

20 Claims, 5 Drawing Sheets

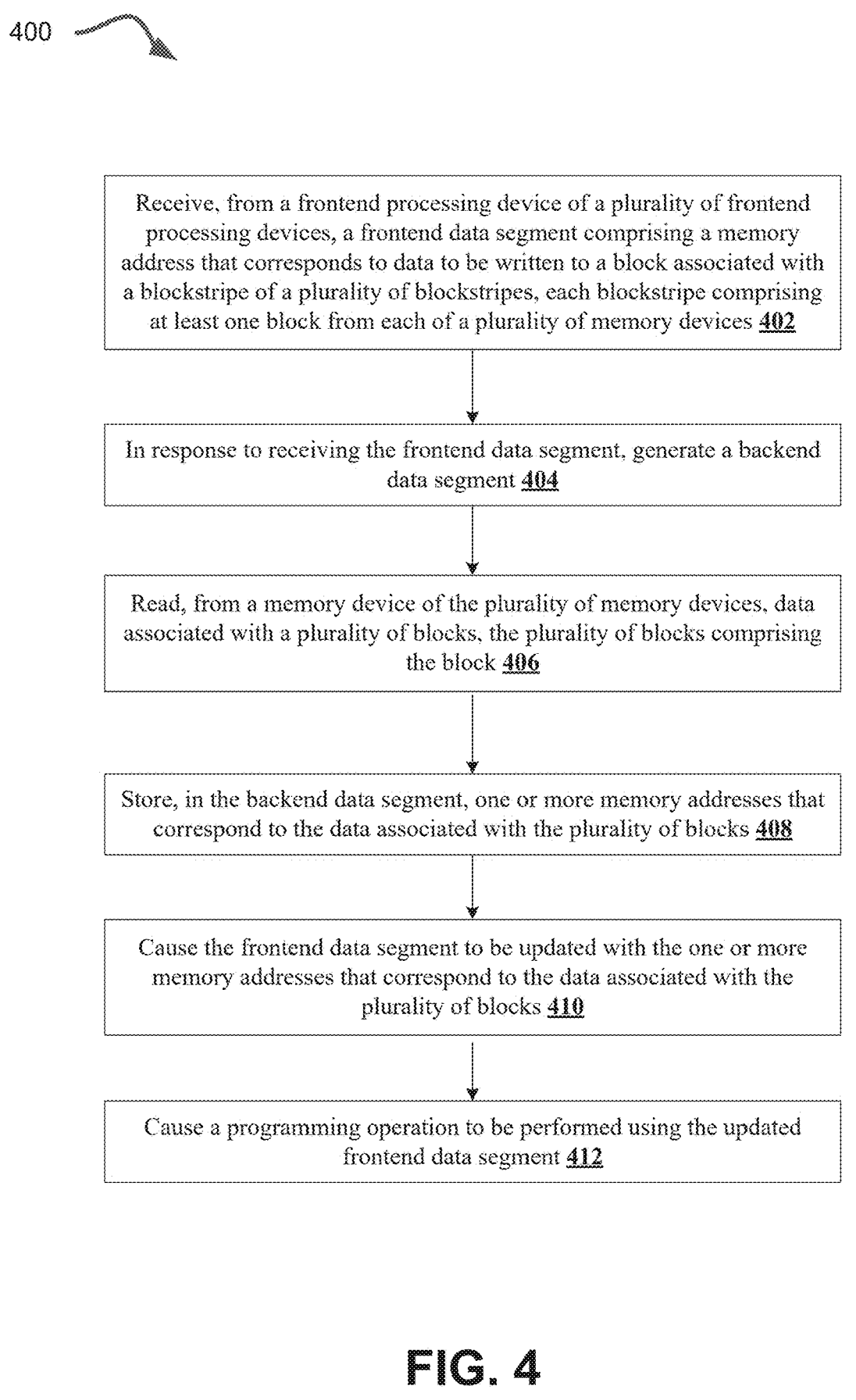

400

Receive, from a frontend processing device of a plurality of frontend processing devices, a frontend data segment comprising a memory address that corresponds to data to be written to a block associated with a blockstripe of a plurality of blockstripes, each blockstripe comprising at least one block from each of a plurality of memory devices 402

In response to receiving the frontend data segment, generate a backend data segment 404

Read, from a memory device of the plurality of memory devices, data associated with a plurality of blocks, the plurality of blocks comprising the block 406

Store, in the backend data segment, one or more memory addresses that correspond to the data associated with the plurality of blocks 408

Cause the frontend data segment to be updated with the one or more memory addresses that correspond to the data associated with the plurality of blocks 410

Cause a programming operation to be performed using the updated frontend data segment 412

FIG. 4

BYPASSING DIRECT MEMORY ACCESS MERGE REQUESTS TO REDUCE LATENCY ASSOCIATED WITH PERFORMING UNALIGNED WRITE OPERATIONS

TECHNICAL FIELD

Embodiments of the disclosure relate generally to memory sub-systems, and more specifically, relate to bypassing direct memory access (DMA) merge requests to reduce latency associated with performing unaligned write operations.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates an example method for bypassing direct memory access (DMA) merge requests to reduce latency associated with performing unaligned write operations, in accordance with some embodiments of the present disclosure.

DETAILED DESCRIPTION

Figure 1:
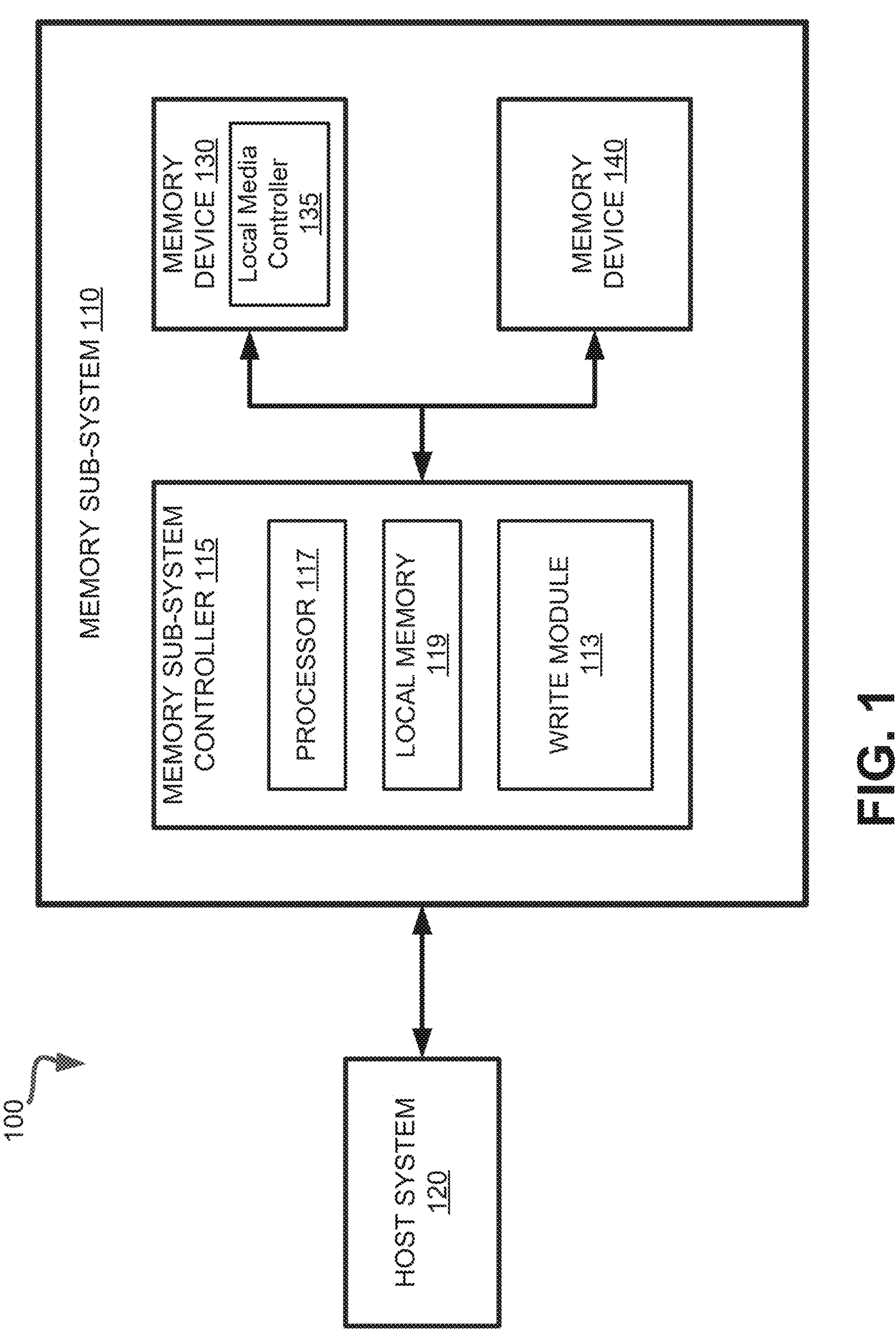
FIG. 1 illustrates an example computing system that includes a memory sub-system, in accordance with some embodiments of the present disclosure.

Aspects of the present disclosure are directed to improving the performance of memory devices by bypassing direct memory access (DMA) merge requests to reduce latency associated with performing unaligned write operations. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not- and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory sub-system can include a plurality of frontend central processing units (CPUs) that communicate (e.g., via a system bus) with at least a plurality of backend CPUs. A backend CPU can be coupled to a plurality of memory devices (e.g., NAND devices). A frontend CPU can transmit commands (e.g., write commands) to a backend CPU for execution on one or more dies that are associated with a specific memory device (e.g., a NAND memory device). A memory device can contain a plurality of dies. Each die can contain a plurality of planes and each plane can include multiple memory cells (also referred to herein as blocks). A blockstripe can include a subset of blocks associated with each plane of each die on a memory device. Each block on a blockstripe can correspond to a logical block address (LBA) that is mapped to a physical block address. An LBA can be a virtual address that corresponds to a block and is used by one or more CPUs during the execution of an application, program, etc. A physical block address can indicate a location on a memory device where the data associated with the block and the corresponding LBA is stored. Write operations can be executed on specific LBAs to write data to corresponding physical block addresses.

To write data to a block, a frontend CPU that is associated with a host device can transmit a write command to a backend CPU that is associated with the block to which the data is to be written. The write command can include a frontend data segment (e.g., a frontend buffer) that is comprised of a first plurality of sub-segments. Each sub-segment of the frontend data segment contains a memory address that maps to a memory location. In some instances, a memory address can map to a physical block address of the data to be written to a block that is associated with a memory device. In some instances, the amount of the data to be written to the block may be less than an amount of data that should be written to the block to maintain the efficiency of the memory device on which the block is located, thereby resulting in an unaligned write command. In such instances, the backend CPU can read a translation unit (TU) from the memory device to which the data is to be written to aggregate the amount of the data to be written to the block to the amount of data that should be written to the block to maintain the efficiency of the memory device. In some instances, the size of the TU can be based on the size of the data packet to be written to the block, system requirements for reducing the latency associated with performing the write command, system requirements for reducing the amount of bandwidth that is needed to perform the write command, the capacity of the memory device, the size of the portion of the memory device that is used to store a table containing logical block addresses (LBAs) to physical block addresses mappings (e.g., an L2P table), etc. For example, a write command can include a 4 KB data packet to be written to a block on a 64 TB memory device that requires 16 GB to store an L2P table. In such instances, the latency, bandwidth, and resources that are needed to perform the write command can be reduced by using a 16 KB TU to aggregate the amount of the data that is written to the memory device during the execution of the write command from 4 KB to 16 KB, for example. The backend CPU can store the TU data in a backend data segment (e.g., a backend buffer) that is comprised of a second plurality of sub-segments. Each sub-segment of the backend data segment contains a memory address that maps to a physical block address that corresponds to the TU data that is read from the memory device.

Responsive to the backend CPU generating the backend data segment, the frontend CPU can aggregate the size of the frontend data segment by storing, in one or more sub-segments of the frontend data segment, at least a portion of the memory addresses that map to physical block addresses of the TU data that is read from the memory device. Returning to the example above, since 16 KB of data are to be written to the memory device (e.g., to reduce the latency, bandwidth, and resources that are needed to perform the write command) and a 16 KB TU is read from the memory device, the frontend CPU can perform a direct memory access (DMA) merge operation to aggregate the size of the frontend data segment, thereby updating the frontend data segment. Specifically, the frontend CPU can update the frontend data segment to include, in a first sub-segment, a memory address that corresponds to a physical block address of the 4 KB data to be written to the memory device and, in the remaining sub-segments, one or more memory addresses that correspond to physical block addresses of 12 KB of the 16 KB TU data. The frontend CPU can provide the updated frontend data segment to the backend CPU. The backend CPU can execute the write command using the updated frontend data segment However, since the DMA merge operation includes copying data from a source memory address (e.g., a sub-segment of the backend data segment) to a destination memory address (e.g., a sub-segment of the frontend data segment), the amount of time that is needed for the DMA merge operation to be completed can vary. As such, the execution of the write command can be delayed, thereby increasing the latency associated with performing write operations on the memory device. Further, in some instances, performing the DMA merge can require additional overhead, thereby increasing the amount of resources that are needed to maintain the functionality of the memory device.

Aspects of the present disclosure address the above and other deficiencies by bypassing direct memory access (DMA) merge requests to reduce latency associated with performing unaligned write operations. The method described herein can be performed by any backend CPU, of a plurality of backend CPUs, that is associated with a memory device. As described above, a frontend CPU that is associated with a host device can transmit a write command to a backend CPU in order to write data to a memory device that is associated with the backend CPU. The write command can include a frontend data segment that includes a first plurality of sub-segments that store memory addresses that map to physical block addresses that correspond to the data to be written to one or more blocks on the memory device. In some instances, the frontend CPU can store memory addresses that map to null frontend data in the frontend data segment to aggregate the size of the frontend data segment. The frontend CPU can aggregate the frontend data segment such that the size of the frontend data segment includes a target amount of data that should be written to the memory device to reduce the latency associated with performing unaligned write operations on the memory device, for example. To aggregate the size of the frontend data segment, the frontend CPU can transmit to the backend CPU instructions to perform an internal read operation on the memory device to which the data is to be written.

Based on receiving the write command and the frontend data segment from the frontend CPU, the backend CPU can generate a backend data segment that is comprised of a second plurality of sub-segments. The backend CPU can allocate one or more sub-segments of the second plurality of sub-segments for one or more memory addresses that map to the data to be written to the memory device. The backend CPU can also allocate one or more sub-segments of the second plurality of sub-segments for the one or more memory addresses that map to null frontend data. The backend CPU can also receive, from the frontend CPU, instructions to perform an internal read operation on the memory device to which the data is to be written. In response to receiving the instructions, the backend CPU can read a translation unit (TU) from the memory device. The size of the TU can vary based on system preferences, such as the target amount of data that should be written to the memory device to reduce the latency associated with the execution of unaligned write commands, reduce an amount of bandwidth needed to execute write commands, reduce the resources needed to process write commands, etc. The TU can include data that is read from a subset of blocks associated with the memory device, including the one or more blocks to which the data is to be written.

The backend CPU can store, in one or more sub-segments of the backend data segment, memory addresses that map to physical block addresses of the data to be written to a block. The backend CPU can replace the memory addresses that map to null frontend data with memory addresses that map to physical block addresses of the TU data that is read from the memory device. The frontend CPU can aggregate the frontend data segment by storing, within sub-segments of the first plurality of sub-segments, one or more memory addresses that map to physical block addresses of the TU data, thereby updating the frontend data segment. Specifically, the frontend CPU can replace the memory addresses that map to null frontend data with one or more of the memory addresses that map to physical block addresses of the TU data that is read from the memory device. The frontend CPU can execute the write command using the updated frontend data segment.

Advantages of the present disclosure include, but are not limited to, reducing latency associated with executing sequential and random unaligned write commands on a memory device. Advantages of the present disclosure further include reducing an amount of bandwidth and resources needed to process and execute sequential and random unaligned write commands on a memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not- and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not- or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a write module 113 that can perform the write commands described herein. In some embodiments, the memory sub-system controller 115 includes at least a portion of the write module 113. In some embodiments, the write module 113 is part of the host system 120, an application, or an operating system. In other embodiments, local media controller 135 includes at least a portion of the write module 113 and is configured to perform the functionality described herein.

In some instances, the write module 113 can be executed by a backend CPU of a plurality of backend CPUs associated with the computing system 100. The write module 113 can receive from a host device (e.g., a device that includes host system 120) a write command to write data to one or more blocks associated with a memory device, such as one of memory devices 130, 140. The write command can include a frontend data segment that includes the data to be written to the one or more blocks and, in some instances, null frontend data that is used to aggregate the size of the frontend data segment. The write module 113 can generate a first backend data segment that is the same size as the frontend data segment and that stores a combination of the null frontend data and null backend data. The write module 113 can read a translation unit (TU) from the memory device and can store the read data in a second backend data segment. The write module 113 can merge the frontend data segment, the first backend data segment, and the second backend data segment to generate an updated data segment. The write module 113 can provide the updated data segment to the host device (e.g., the device that includes host system 120) to enable the host device to write the data in the updated data segment to the memory device. Further details regarding the operations of the write module 113 are described below.

Figure 2:
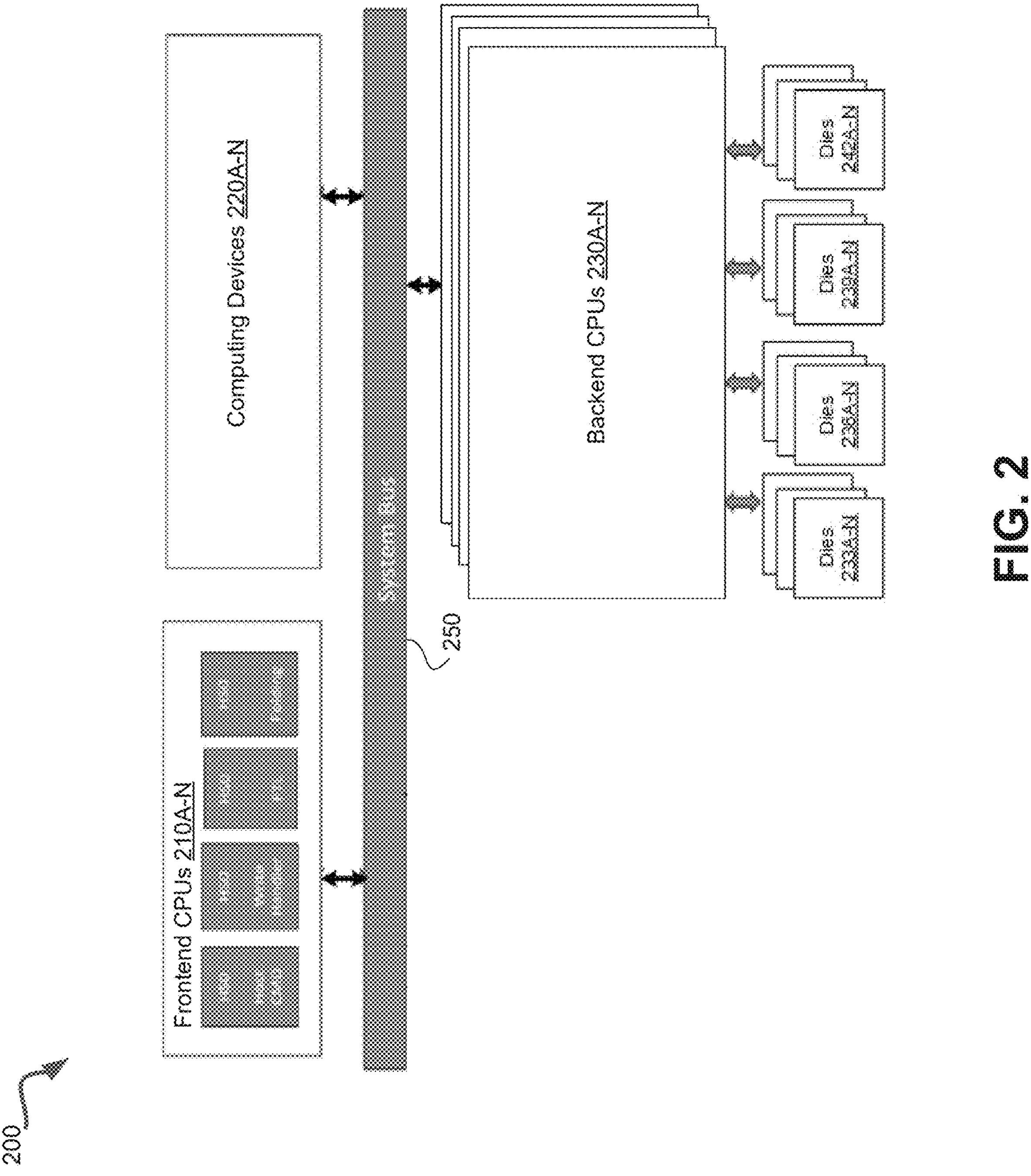
FIG. 2 illustrates an example computing system that includes a memory sub-system, in accordance with some embodiments of the present disclosure.

FIG. 2 illustrates an example computing system that includes a memory sub-system, in accordance with some embodiments of the present disclosure. Example computing system 200 can include frontend central processing units (CPUs) 210*a-n*, computing devices 220*a-n*, system bus 250, backend CPUs 230*a-n*, and/or dies 233*a-n*, 236*a-n*, 239*a-n*, 242*a-n*. In some instances, computing system 200 and the components therein can correspond to components of computing system 100. For example, a computing device that includes host system 120 can include any of frontend CPUs 210*a-n*. In such instances, frontend CPUs 210*a-n* can generate commands to write data to specific memory devices. In some instances, backend CPUs 230*a-n* can reside within memory sub-system controller 115. In such instances, any of backend CPUs 230*a-n* can correspond to write module 113. As such, backend CPUs 230*a-n* can process the write commands that are generated by frontend CPUs 210*a-n*. In some instances, each of dies 233*a-n*, 236*a-n*, 239*a-n*, 242*a-n* can correspond to memory devices 130, 140. The components of computing system 200 are described in further detail below.

A frontend CPU can be a CMD host CPU, a write handler CPU, a flash translation layer (FTL) CPU, and/or a folding CPU. In some instances, any one of frontend CPUs 210*a-n* can be configured to perform the operations of the frontend CPU described herein.

Computing system 200 can further include additional computing devices, such as computing devices 220*a-n*. Computing devices 220*a-n* can correspond to any of a double data rate (DDR) controller, a universal asynchronous receiver/transmitter (UART), a power management unit (PMU), a component that implements an improved inter integrated circuit (13C) standard, a distributed management environment (DME) component, and/or additional and/or alternative memory devices (e.g., a static random-access memory (SRAM) device).

In some instances, computing system 200 can include a peripheral component interconnect express (PCIe) controller. The PCIe controller can facilitate communication between the computing system 200 and one or more peripheral devices couples to the computing system 200. The computing system 200 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

Computing system 200 can include backend CPUs 230*a-n*. A backend CPU can be in communication with a plurality of dies (e.g., dies 233*a-n*, 236*a-n*, 239*a-n*, 242*a-n*) that are associated with one or more memory devices. Each die can include a plurality of blocks. The plurality of blocks can be associated with a plurality of blockstripes of the memory device where a blockstripe includes at least one block of each die associated with the memory device.

A frontend CPU (e.g., one of frontend CPUs 210*a-n*) can transmit a write command to a backend CPU (e.g., one of backend CPUs 230*a-n*). In some instances, the write command can include a frontend data segment, which is comprised of a first plurality of sub-segments. One or more sub-segments of the frontend data segment can store memory addresses that map to physical block addresses that correspond to the data to be written to one or more blocks of a memory device (e.g., host data). In instances where the amount of data to be written to the memory device is less than a target amount of data that should be written to the memory device to avoid an unaligned write command, one or more sub-segments of the frontend data segment can store memory addresses that map to null frontend data to aggregate the size of the frontend data segment to the target amount of data that should be written to the memory device. The frontend CPU can provide the frontend data segment to the backend CPU. The frontend CPU can instruct the backend CPU to perform an internal read operation on the memory device to which the data is to be written. Based on the execution of the internal read operation by the backend CPU, the frontend CPU can aggregate the size of the frontend data segment by storing in the frontend data segment memory addresses that map to physical block addresses that correspond to the data that is read from the memory device. For example, within the frontend data segment, the frontend CPU can replace the memory addresses that map to null frontend data with one or more memory addresses that map to physical block addresses of at least a portion of the data that is read from the memory device, thereby updating the frontend data segment. The frontend CPU can execute the write command using the updated frontend data segment . . . .

The backend CPU can receive the frontend data segment from the frontend CPU and allocate a backend data segment that comprises a second plurality of sub-segments. The backend CPU can allocate one or more sub-segments of the second plurality of sub-segments to store one or more memory addresses that map to the data to be written to the memory device. The remaining sub-segments of the second plurality of sub-segments can store the memory addresses that map to null frontend data. The backend CPU can also receive, from the frontend CPU, instructions to perform an internal read operation on the memory device to which the data is to be written. The backend CPU can read a translation unit (TU) from the memory device to which the data is to be written. The TU can include data that pertains to a subset of blocks of the memory device, including the one or more blocks to which the data is to be written. Based on performing the internal read operation, the backend CPU can update the backend data segment. For example, the backend CPU can store, in one or more sub-segments of the backend data segment, one or more memory addresses that map to physical block addresses of the data to be written to the memory device. The backend CPU can store, in the remaining sub-segments of the backend data segment, one or more memory addresses that map to physical block address of the TU data (e.g., to aggregate the size of the backend data segment to include the target amount of data that should be written to the memory device).

The backend data segment can store the same memory addresses that map to null frontend data as the frontend data segment. When the backend CPU performs the internal read operation and reads TU data from the memory device, the backend CPU can update the backend data segment to include the memory addresses that map to physical block addresses of the TU data. Since the frontend data segment stores the same memory addresses that map to null frontend data, the frontend CPU can similarly update the frontend data segment to include the memory addresses that map to physical block addresses of the TU data.

In some instances, the components of computing system 200 (e.g., frontend CPUs 210*a-n*, computing devices 220*a-n*, backend CPUs 230*a-n*, dies 233*a-n*, dies 236*a-n*, dies 239*a-n*, dies 242*a-n*) can communicate via system bus 250.

Figure 3:
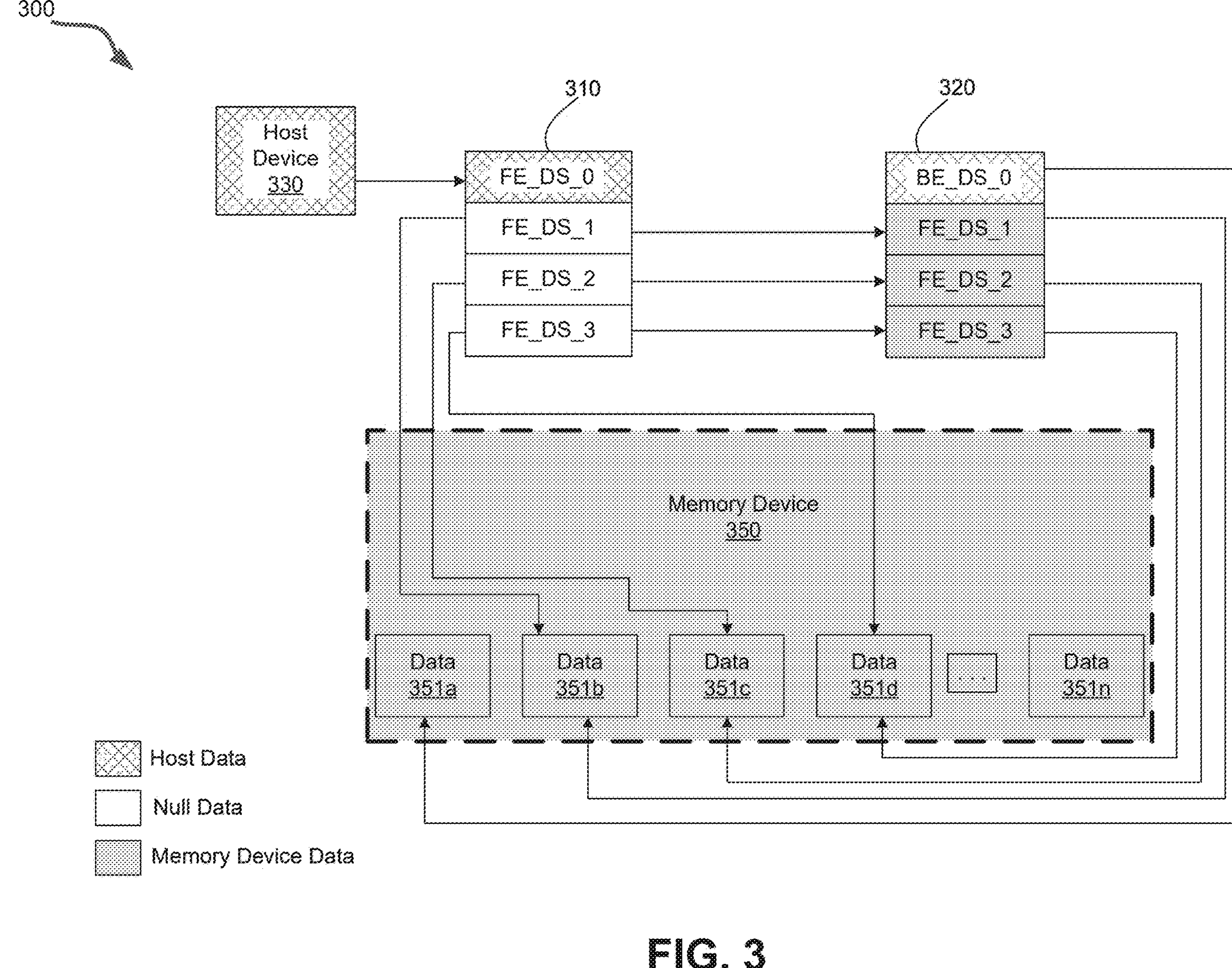
FIG. 3 illustrates a flow diagram of an example method of bypassing direct memory access (DMA) merge requests to reduce latency associated with performing unaligned write operations, in accordance with some embodiments of the present disclosure.

FIG. 3 illustrates a flow diagram of an example method of bypassing direct memory access (DMA) merge requests to reduce latency associated with performing unaligned write operations, in accordance with some embodiments of the present disclosure. A frontend CPU (e.g., of frontend CPUs 210*a-n*) that is associated with a host device (e.g., a device that includes host system 120) can generate a command to write data to one or more blocks on a die (e.g., of dies 233*a-n*, 236*a-n*, 239*a-n*, 242*a-n*) that is associated with a memory device. The command can include a frontend data segment (e.g., a frontend buffer), as illustrated by element 310. The frontend data segment can include a first plurality of sub-segments. One or more sub-segments of the frontend data segment can store memory addresses that map to physical block addresses of the data to be written to the one or more blocks of the memory device, also referred to as host data. The frontend CPU can receive the host data to be written to the memory device from a host device, such as host device 330. In some instances, one or more sub-segments of the first plurality of sub-segments can store memory addresses that map to null frontend data. The memory addresses that map to the null frontend data can be stored in the frontend data segment to aggregate the size of the frontend data segment. The size (e.g., capacity) of the frontend data segment can be based on, for example, a target amount of data that should be written to the memory device to reduce the latency, bandwidth, and resources that are needed to process and execute unaligned write commands. Therefore, the memory addresses that map to the null frontend data can be stored in the frontend data segment to aggregate the size of the frontend data segment to equal the target amount of data that should be written to the memory device. Element 310 illustrates an example 16 KB frontend data segment that comprises four 4 KB sub-segments (e.g., FE_DS_0, FE_DS_1, FE_DS_2, and FE_DS_3). As illustrated by element 310, sub-segment FE_DS_O contains a memory address that maps to a physical block address that corresponds to 4 KB data to be written to a block on a die associated with a memory device. The remaining sub-segments of element 310 (e.g., FE_DS_1, FE_DS_2, FE_DS_3) contain memory addresses that map to null frontend data.

The frontend CPU can provide the frontend data segment to a backend CPU. Upon receipt of the frontend data segment, the backend CPU can allocate a backend data segment that includes a second plurality of sub-segments. The backend CPU can allocate one or more sub-segments of the second plurality of sub-segments for memory addresses that map to the data to be written to the memory device. The backend CPU can aggregate the size of the backend data segment to include the target amount of data that should be written to the memory device. For example, the backend CPU can allocate any remaining sub-segments of the second plurality of sub-segments for the memory addresses that map to null frontend data. Element 320 illustrates an example 16 KB backend data segment that comprises four 4 KB sub-segments (e.g., BE_DS_0, FE_DS_1, FE_DS_2, and FE_DS_3). As illustrated by element 320, sub-segment BE_DS_0 is allocated for a memory address that maps to a physical block address of the 4 KB data to be written to the memory device (e.g., the host data associated with host device 330). Further, as illustrated by element 320, sub-segments FE_DS_1, FE_DS_2, and FE_DS_3 are allocated for 12 KB of null frontend data.

The backend CPU can receive, from the frontend CPU, instructions to perform an internal read operation on the memory device to which the data is to be written, such as memory device 350. In some instances, memory device 350 can correspond to memory device 130, 140 of computing system 100. In response to receiving the instructions, the backend CPU can read a TU from the memory device. The TU can include data that pertains to a subset of blocks on dies that are associated with the memory device, including the block(s) to which the data is to be written. In some instances, the size of the TU is based on system preferences, such as an amount of data that should be written to the memory device during the execution of a single write command to reduce the latency, bandwidth, and resources that are needed to process and execute the write command while maintaining the efficiency of the memory device. In some instances, the size of each data segment that is generated to execute the write command (e.g., the frontend data segment, the backend data segment) can be based on the size of the TU.

For each memory address in the backend data segment, the backend CPU can read the data at the corresponding physical block address. Referring to element 320, the backend CPU can read the data that is written to the physical block address that corresponds to the memory address in sub-segment BE_DS_0 (e.g., 4 KB data 351*a* that is stored in memory device 350). The backend CPU can read the data that is written to the physical block addresses that correspond to the memory addresses in sub-segments FE_DS_1, FE_DS_2, and FE_DS_3 (e.g., 4 KB data 351*b*, 4 KB 351*c*, and 4 KB 351*d*, respectively, that are stored in memory device 350). In instances where the memory addresses in sub-segments FE_DS_1, FE_DS_2, and FE_DS_3 map to null frontend data, the backend CPU can read data in one or more blocks surrounding the block(s) to which the data is to be written, for example. The backend CPU can store, in sub-segments FE_DS_1, FE_DS_2, and FE_DS_3, memory addresses that correspond to the physical block addresses of the TU data read from memory device 350. Since the frontend data segment stores one or more of the same memory addresses in sub-segments of the frontend data segment (e.g., FE_DS_1, FE_DS_2, and FE_DS_3), the frontend data segment can similarly update the frontend data segment with memory addresses that correspond to the physical block addresses of the TU data read from memory device 350. The frontend CPU can use the updated frontend data segment to write the data (e.g., the host data) to the memory device to execute the write command.

FIG. 4 illustrates an example method for bypassing direct memory access (DMA) merge requests to reduce latency associated with performing unaligned write operations, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the write module 113 of FIG. 1 and/or any of backend CPUs 230*a-n* of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic can receive, from a frontend processing device of a plurality of frontend processing devices, a frontend data segment that includes a memory address that corresponds to data to be written to a block associated with a blockstripe of a plurality of blockstripes. Each blockstripe can include at least one block from each memory device of a plurality of memory devices. A first portion of the frontend data segment can include the memory address that corresponds to the data to be written to the block. The memory address can map to a physical block address that corresponds to the data to be written to the block. The remaining portions of the frontend data segment can include a plurality of memory addresses that map to null frontend data. The plurality of memory addresses that map to the null frontend data can be stored in the frontend data segment to aggregate the size of the frontend data segment to match a target amount of data to be written to the memory device.

At operation 404, the processing logic can, in response to receiving the frontend data segment, generate a backend data segment. The processing logic can store, in a first portion of the backend data segment, the memory address that corresponds to the data to be written to the block. The memory address can map to a physical block address that corresponds to the data to be written to the block. The remaining portions of the backend data segment can include a plurality of memory addresses that map to null frontend data. The plurality of memory addresses that map to the null frontend data can be stored in the backend data segment to aggregate the size of the backend data segment to match the target amount of data to be written to the memory device.

At operation 406, the processing logic can read, from a memory device of the plurality of memory devices, data associated with a plurality of blocks. The plurality of blocks can comprise the block to which the data is to be written.

At operation 408, the processing logic can store, in the backend data segment, one or more memory addresses that correspond to the data that is associated with the plurality of blocks. In some instances, the processing logic can replace, within the backend data segment, the plurality of memory addresses that map to the null frontend data with the one or more memory addresses that correspond to the data that is read from a plurality of blocks that are associated with the memory device. Each of the one or more memory addresses that correspond to the data that is read from the plurality of blocks that are associated with the memory device can map to a physical block address that corresponds to the data that is associated with the plurality of blocks.

At operation 410, the processing logic can cause the frontend data segment to be updated with the one or more memory addresses that correspond to the data associated with the plurality of blocks. A first portion of the updated frontend data segment can include the memory address that corresponds to the data to be written to the block. The memory address can map to a physical block address that corresponds to the data to be written to the block. The remaining portions of the updated frontend data segment can include the one or more memory addresses that correspond to the data associated with the plurality of blocks.

At operation 412, the processing logic can cause a programming operation to be performed using an updated frontend data segment. For example, the processing logic can cause the data to be written to the memory device using the memory addresses that are stored in the updated frontend data segment.

Figure 5:
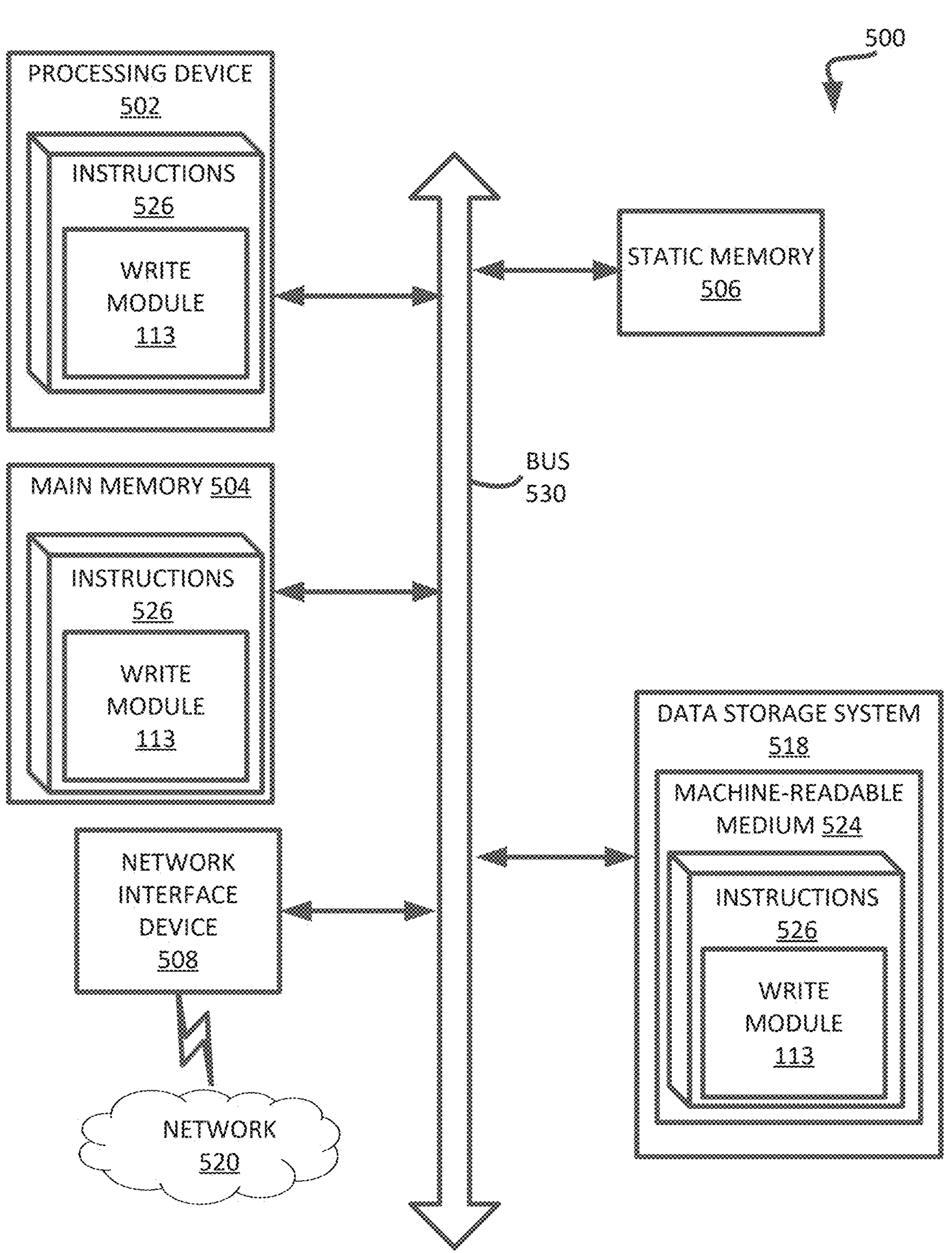
FIG. 5 illustrates a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write module 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 can include a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which can communicate with each other via a bus 530.

Processing device 502 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 can be configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 can include instructions to implement functionality corresponding to a write module (e.g., the write module 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD- ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a plurality of memory devices;

a plurality of frontend processing devices; and a plurality of backend processing devices operatively coupled to the plurality of memory devices and to the plurality of frontend processing devices, and configured to perform operations comprising:

receiving, from a frontend processing device of the plurality of frontend processing devices, a frontend data segment comprising a memory address that corresponds to data to be written to a block associated with a blockstripe of a plurality of blockstripes, each blockstripe comprising at least one block from each of the plurality of memory devices;

in response to receiving the frontend data segment, generating a backend data segment;

reading, from a memory device of the plurality of memory devices, data associated with a plurality of blocks, the plurality of blocks comprising the block;

storing, in the backend data segment, one or more memory addresses that correspond to the data associated with the plurality of blocks;

causing the frontend data segment to be updated with the one or more memory addresses that correspond to the data associated with the plurality of blocks; and causing a programming operation to be performed using the updated frontend data segment.

2. The system of claim 1, wherein a first portion of the frontend data segment comprises the memory address that corresponds to the data to be written to the block, wherein the memory address maps to a physical block address that corresponds to the data to be written to the block; and wherein remaining portions of the frontend data segment comprise a plurality of memory addresses that map to null frontend data.

3. The system of claim 2, wherein the plurality of memory addresses that map to the null frontend data aggregate a size of the frontend data segment to match a target amount of data to be written to the memory device.

4. The system of claim 1, wherein the plurality of backend processing devices are further configured to perform operations comprising:

storing, in a first portion of the backend data segment, the memory address that corresponds to the data to be written to the block, wherein the memory address maps to a physical block address that corresponds to the data to be written to the block.

5. The system of claim 4, wherein the plurality of backend processing devices are further configured to perform operations comprising:

storing, in remaining portions of the backend data segment, a plurality of memory addresses that map to null frontend data.

6. The system of claim 5, wherein the plurality of memory addresses that map to the null frontend data aggregate a size of the backend data segment to match a target amount of data to be written to the memory device.

7. The system of claim 5, wherein the plurality of backend processing devices are further configured to perform operations comprising:

replacing the plurality of memory addresses that map to the null frontend data with the one or more memory addresses that correspond to the data associated with the plurality of blocks.

8. The system of claim 7, wherein each of the one or more memory addresses that correspond to the data associated with the plurality of blocks maps to a physical block address that corresponds to the data associated with the plurality of blocks.

9. The system of claim 1, wherein a first portion of the updated frontend data segment comprises the memory address that corresponds to the data to be written to the block, wherein the memory address maps to a physical block address that corresponds to the data to be written to the block; and wherein remaining portions of the updated frontend data segment comprise the one or more memory addresses that correspond to the data associated with the plurality of blocks.

10. A method comprising:

receiving, from a frontend processing device of a plurality of frontend processing devices, a frontend data segment comprising a memory address that corresponds to data to be written to a block associated with a blockstripe of a plurality of blockstripes, each blockstripe comprising at least one block from each memory device of a plurality of memory devices;

in response to receiving the frontend data segment, generating a backend data segment;

reading, from a memory device of the plurality of memory devices, data associated with a plurality of blocks, the plurality of blocks comprising the block;

storing, in the backend data segment, one or more memory addresses that correspond to the data associated with the plurality of blocks;

causing the frontend data segment to be updated with the one or more memory addresses that correspond to the data associated with the plurality of blocks; and causing a programming operation to be performed using the updated frontend data segment.

11. The method of claim 10, wherein a first portion of the frontend data segment comprises the memory address that corresponds to the data to be written to the block, wherein the memory address maps to a physical block address that corresponds to the data to be written to the block; and wherein remaining portions of the frontend data segment comprise a plurality of memory addresses that map to null frontend data.

12. The method of claim 10, further comprising:

storing, in a first portion of the backend data segment, the memory address that corresponds to the data to be written to the block, wherein the memory address maps to a physical block address that corresponds to the data to be written to the block.

13. The method of claim 12, further comprising:

storing, in remaining portions of the backend data segment, a plurality of memory addresses that map to null frontend data.

14. The method of claim 13, further comprising:

replacing the plurality of memory addresses that map to the null frontend data with the one or more memory addresses that correspond to the data associated with the plurality of blocks.

15. The method of claim 10, wherein a first portion of the updated frontend data segment comprises the memory address that corresponds to the data to be written to the block, wherein the memory address maps to a physical block address that corresponds to the data to be written to the block; and wherein remaining portions of the updated frontend data segment comprise the one or more memory addresses that correspond to the data associated with the plurality of blocks.

16. A non-transitory computer readable storage medium comprising instructions that, when executed by a plurality of backend processing devices, cause the plurality of backend processing devices to perform operations comprising:

receiving, from a frontend processing device of a plurality of frontend processing devices, a frontend data segment comprising a memory address that corresponds to data to be written to a block associated with a blockstripe of a plurality of blockstripes, each blockstripe comprising at least one block from each memory device of a plurality of memory devices;

in response to receiving the frontend data segment, generating a backend data segment;

reading, from a memory device of the plurality of memory devices, data associated with a plurality of blocks, the plurality of blocks comprising the block;

storing, in the backend data segment, one or more memory addresses that correspond to the data associated with the plurality of blocks;

causing the frontend data segment to be updated with the one or more memory addresses that correspond to the data associated with the plurality of blocks; and causing a programming operation to be performed using the updated frontend data segment.

17. The non-transitory computer readable storage medium of claim 16, wherein a first portion of the frontend data segment comprises the memory address that corresponds to the data to be written to the block, wherein the memory address maps to a physical block address that corresponds to the data to be written to the block; and wherein remaining portions of the frontend data segment comprise a plurality of memory addresses that map to null frontend data.

18. The non-transitory computer readable storage medium of claim 16, wherein the instructions, when executed, further cause the plurality of backend processing devices to perform operations comprising:

storing, in a first portion of the backend data segment, the memory address that corresponds to the data to be written to the block, wherein the memory address maps to a physical block address that corresponds to the data to be written to the block; and storing, in remaining portions of the backend data segment, a plurality of memory addresses that map to null frontend data.

19. The non-transitory computer readable storage medium of claim 18, wherein the instructions, when executed, further cause the plurality of backend processing devices to perform operations comprising:

replacing the plurality of memory addresses that map to the null frontend data with the one or more memory addresses that correspond to the data associated with the plurality of blocks.

20. The non-transitory computer readable storage medium of claim 16, wherein a first portion of the updated frontend data segment comprises the memory address that corresponds to the data to be written to the block, wherein the memory address maps to a physical block address that corresponds to the data to be written to the block; and wherein remaining portions of the updated frontend data segment comprise the one or more memory addresses that correspond to the data associated with the plurality of blocks.

* * * * *